(12) United States Patent
Ramond et al.

(10) Patent No.: US 8,505,511 B2
(45) Date of Patent: Aug. 13, 2013

(54) GLOW PLUG WITH INTEGRATED PRESSURE SENSOR AND BODY THEREOF

(75) Inventors: Alain Ramond, Merville (FR); John Burrows, Cheshire (GB); Sandro Goretti, Rubiera (IT); Cyrille Patri, Toulouse (FR); Laura Beretta, Modena (IT)

(73) Assignees: Continental Automotive France, Toulouse (FR); Federal-Mogul Ignition Srl, Carpi (IT)

( * ) Notice: Subject to any disclaimer, the term of this patent is extended or adjusted under 35 U.S.C. 154(b) by 576 days.

(21) Appl. No.: 11/918,365

(22) PCT Filed: Mar. 30, 2006

(86) PCT No.: PCT/FR2006/000689
§ 371 (c)(1),
(2), (4) Date: Aug. 29, 2008

(87) PCT Pub. No.: WO2006/108939
PCT Pub. Date: Oct. 19, 2006

(65) Prior Publication Data
US 2009/0056663 A1    Mar. 5, 2009

(30) Foreign Application Priority Data
Apr. 12, 2005 (FR) ..................................... 05 03607

(51) Int. Cl.
*F02B 3/00*    (2006.01)
*F02G 5/00*    (2006.01)

(52) U.S. Cl.
USPC ..................... 123/179.21; 123/549

(58) Field of Classification Search
USPC ............. 123/179.21, 549, 543, 143 R, 145 A, 123/145 R, 169 EC, 169 PA, 179.6, 612, 123/613, 614, 615, 616, 617, 647; 219/260, 219/270; 313/11.5; 73/119 R
See application file for complete search history.

(56) References Cited

U.S. PATENT DOCUMENTS

| 4,742,209 | A  * | 5/1988 | Minegishi et al. ............ 219/270 |
| 6,539,787 | B1 * | 4/2003 | Murai et al. ................ 73/114.21 |
| 7,034,253 | B2 * | 4/2006 | Yoshikawa et al. ........... 219/270 |
| 7,444,973 | B2 * | 11/2008 | Boucard et al. ............ 123/179.6 |
| 2001/0015402 | A1 * | 8/2001 | Murai et al. .................. 248/554 |
| 2004/0182144 | A1 * | 9/2004 | Okazaki et al. .............. 73/118.1 |
| 2005/0061063 | A1 * | 3/2005 | Haussner et al. ............... 73/116 |

(Continued)

FOREIGN PATENT DOCUMENTS

| DE | 196 80 912 C2 | 4/2001 |
| EP | 1 096 141 A2 | 5/2001 |
| FR | 2 845 463 A | 4/2004 |

*Primary Examiner* — Stephen K Cronin
*Assistant Examiner* — Sizo Vilakazi
(74) *Attorney, Agent, or Firm* — Young & Thompson

(57) ABSTRACT

A glow plug includes: a tubular body (2) having at one of its ends a plug head (10) as well as a zone for being fixed into a bore, an arm (4) mounted on the body (2) of the plug at the end opposite to the plug head (10), and secured to the body (2) in a linking zone (16), an elastically deformable portion (18), located between the linking zone (16) with the arm (4) and the zone fixing the plug body (2), such that the linking zone (16) is mobile and can move longitudinally relative to the so-called stationary fixing zone, and a pressure sensor (8) arranged between an element (30) secured to the linking zone (16) and a fixed element (20) of the plug.

16 Claims, 2 Drawing Sheets

(56) References Cited

U.S. PATENT DOCUMENTS

| | | | |
|---|---|---|---|
| 2007/0209624 A1* | 9/2007 | Ludwig et al. | 123/145 A |
| 2007/0245806 A1* | 10/2007 | Hirose et al. | 73/35.13 |
| 2007/0289370 A1* | 12/2007 | Hirose et al. | 73/116 |

* cited by examiner

GLOW PLUG WITH INTEGRATED PRESSURE SENSOR AND BODY THEREOF

The present invention concerns a glow plug with integrated pressure sensor and a body of such a glow plug.

In an internal combustion engine, in particular a diesel type engine, each cylinder has a glow plug for heating the interior of the corresponding combustion chamber, in particular when starting the engine. This glow plug is disposed in a threaded bore that passes through the cylinder head of the engine. This glow plug therefore includes a threaded body adapted to be fitted into the corresponding bore of the cylinder head and a finger in which a preheating electrode is housed.

It is also known to integrate a pressure sensor into such a glow plug. In effect, it has been noticed that a knowledge of the value of the pressure inside each cylinder made it possible to improve control of the progress of combustion in the engine. This information is then used to regulate the injection of fuel into each of the cylinders. In this way, pollutant emissions from the engine can be reduced and fuel consumption optimized.

In prior art glow plugs with an integrated pressure sensor, the latter is housed in a portion of the body of the glow plug called the glow plug head or mounted on the glow plug head. The latter is the portion of the body of the glow plug that is outside the cylinder. The document EP-1 096 141 discloses one such glow plug, for example.

In these glow plugs, it is necessary to transmit the pressure in the corresponding cylinder in the engine to the pressure sensor disposed outside the engine, in or on the glow plug head. Various assemblies have been described such that the forces exerted on the finger of the glow plug situated in the cylinder are retransmitted to the pressure sensor. Various mechanical parts are the inserted between the pressure sensor and the finger of the glow plug. These various intermediary parts influence the measurement effected.

Moreover, because of its position, the pressure sensor of such glow plugs is also subjected to external vibrations. Stresses in the cylinder head can also interfere with the measurements effected by the pressure sensor of such a glow plug.

The prior art glow plugs therefore have the drawback of necessitating a precise mechanical fit when assembling them, which leads to a high unit cost. Moreover, despite all the care taken with mechanical assembly, unwanted forces interfere with the measurement effected by the pressure sensor.

Thus an object of the present invention is to provide means for optimum measurement of the pressure inside a cylinder of an internal combustion engine without being influenced in particular by deformations and stresses in the cylinder head, forces caused by expansion and temperature variations, etc. The pressure measurement must also be effected in a hostile environment (high temperatures, high pressures, presence of particles, etc.) but must be reliable.

To this end, the invention proposes a glow plug including:
 a tubular body having at one end a glow plug head and a fixing area having means for fixing it into a bore,
 a finger mounted on the body of the glow plug at the end opposite the glow plug head, and
 a pressure sensor.

For such a glow plug, the present invention provides that the finger is fixed to the glow plug body so as to be fastened thereto in a connecting area, the glow plug body has between its area connected to the finger and its area for fixing it into a bore an elastically deformable part such that said connecting area is mobile and can be moved in the longitudinal direction relative to the fixing area in a bore that is assumed to be fixed, and the pressure sensor is disposed between a element fastened to the connecting area and a fixed element of the glow plug.

In this way, the elastically deformable part acts as a membrane that divides the body of the glow plug into two parts, a fixed part intended to be mounted in a cylinder head and a mobile part subjected to the pressure in a cylinder of the corresponding engine. This membrane can be deformed and the mobile part can be moved longitudinally. That movement, which is a function of the pressure, is then transmitted to the pressure sensor, which can thus give an indication of the pressure exerted on the finger of the glow plug. Thanks to this new design, the measurements from the pressure sensor are no longer disturbed by unwanted vibrations or stress forces caused by screwing the glow plug into the corresponding cylinder head, for example. In effect, the movement of the membrane is not affected by the stresses in the cylinder head or in the rest of the body of the glow plug.

In one preferred embodiment the elastically deformable part is an annular area extending in a plane transverse to the body of the glow plug. In this way, temperature variations, which cause expansion of the elastically deformable part, do not influence the longitudinal movement of the mobile part of the glow plug.

In a glow plug according to the invention, the elastically deformable part can be obtained by thinning material, for example.

A compact embodiment of a glow plug according to the invention is one in which the tubular body has on its exterior surface a sealing cone adapted to provide a seal between the glow plug and a cylinder head and the elastically deformable part is near said sealing cone.

In one embodiment of the invention, the pressure sensor is assembled in such a way that this sensor is mounted between a bearing part fixed with respect to the fixing area and a part fastened to the finger, mobile with the connecting area. In this variant, the fixed bearing part can be situated between the elastically deformable part and the pressure sensor and the part fastened to the finger fixed to a preloaded core on the sensor supplying the finger with power. The aforementioned part fastened to the finger is a ring welded to the core, for example. It could also be a nut screwed onto the core, for example, possibly retained by a locknut.

A piezo-electric sensor is particularly suitable for use as a pressure sensor in a glow plug according to the invention.

In a glow plug according to the invention, the pressure sensor is preferably disposed in the tubular body in the region of the area for fixing the glow plug into a bore. The sensor can then be very close to the cylinder, which favors obtaining a good pressure measurement.

The present invention also concerns a glow plug body having at one end a glow plug head and a fixing area having means for fixing it into a bore, characterized in that it has between its area connected to the finger and its area for fixing it into a bore an elastically deformable part such that said connecting area is mobile and can be moved in the longitudinal direction relative to the fixing area in a bore that is assumed to be fixed. In such a glow plug body, the elastically deformable part is preferably an annular area extending in a plane transverse to the body of the glow plug.

The present invention finally concerns an internal combustion engine, in particular a diesel type engine, which includes a glow plug as described hereinabove.

Details and advantages of the present invention will emerge more clearly from the following description, given with reference to the appended diagrammatic drawings, in which.

Figure 1:
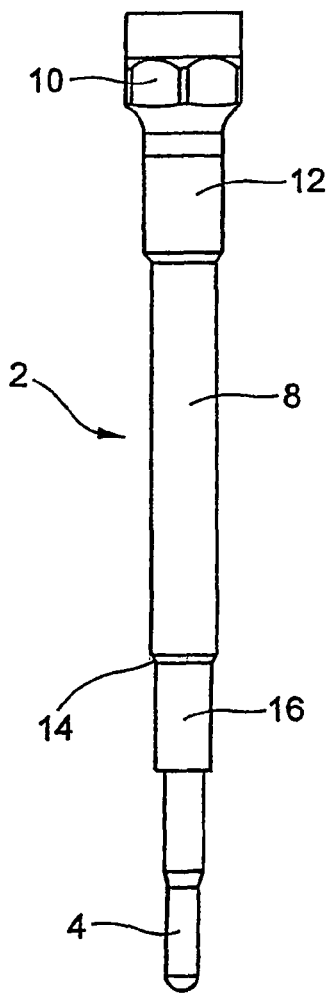
FIG. 1 is an exterior view of a glow plug of the invention.
Figure 2:
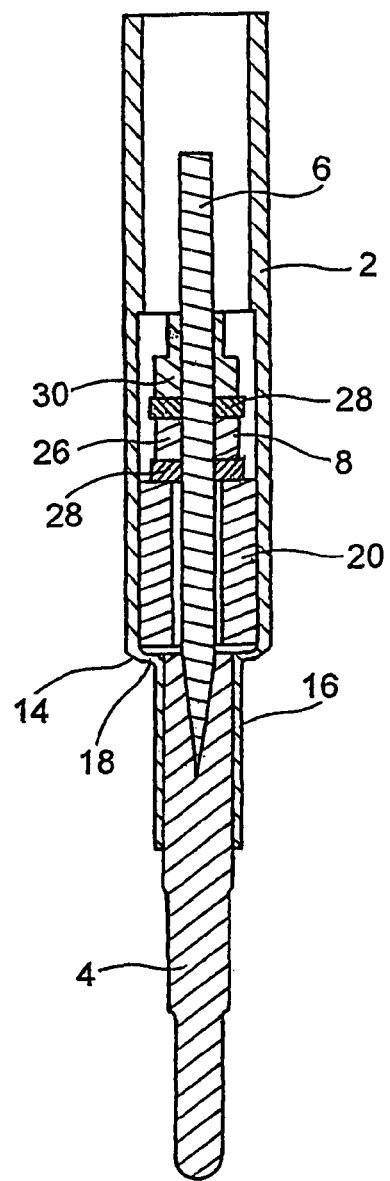
FIG. 2 is a view in longitudinal section of the lower part of the pressure sensor from FIG. 1.

In FIGS. 1 and 2 there are seen a glow plug including in a manner known to the person skilled in the art a body 2, a finger 4, a core 6 and a pressure sensor 8.

The body 2 is of tubular shape and features a plurality of circular cylindrical segments. At a first end, called the glow plug head 10, the glow plug body has a holding area with an exterior surface of hexagonal cross section. This holding area is used for fitting and removing the glow plug by screwing/unscrewing it. For fitting it, a threaded area 12 is provided adjacent to the glow plug head 10. A corresponding thread is provided in a cylinder head of an engine to cooperate with the threaded area 12. To perfect the seal between the cylinder head and the glow plug, there is also provision for forming a sealing cone 14 on the body 2. This cone cooperates with a complementary conical surface formed in the cylinder head and through shapes that fit together provides an excellent seal between the two parts.

On the side opposite the glow plug head, the glow plug body 2 carries the latter's finger 4. This finger is intended to be placed in a combustion chamber of the corresponding engine. This finger 4 forms the heating element of the glow plug.

As represented in the drawings, the finger 4 is preferably a ceramic finger. This type of finger is known to the person skilled in the art and is not described in more detail here. It produces a small heating element. This finger 4 is fed with electrical current by the core 6 that passes through the whole of the body 2 of the glow plug. In the region of the glow plug head 10, a connection (not shown) is provided for connecting the core 6 to a source of electrical current.

The end of the glow plug body 2 opposite the glow plug head carries the finger 4. This end is an area of circular cylindrical section the inside diameter of which is adapted to the outside diameter of the finger 4. The finger 4 is brazed to the end 16 of the glow plug body 2, for example. The brazing can be effected over all the height of the end 16 the diameter whereof is adapted to the diameter of the finger 4. Brazing fastens the finger 4 to the end 16 of the glow plug body 2. Other techniques could be used here to fasten the finger 4 to the end 16 of the body 2. The lower part of the glow plug body 2 comprising the end 16 can be made from a material suitable for brazing. This material preferably has a coefficient of expansion close to that of the ceramic used to produce the finger 4. Thus the glow plug body 2 can be an assembly of several parts. Note that the body 2 represented in FIG. 3 includes a junction plane corresponding to the assembly of two parts welded to each other to form the body 2.

The end 16 of the glow plug body 2 forms a connecting area between the glow plug body 2 and the finger 4. This connecting area is connected to the rest of the glow plug body 2 by an elastically deformable part of the body, this elastic part being called the membrane 18 hereinafter. The connection of the end 16 to the rest of the glow plug body 2 is effected, through the intermediary of the membrane 18, in the region of the sealing cone 14.

The membrane 18 takes the form of an annular washer disposed in a plane perpendicular to the axis of the glow plug body 2. The thickness of the membrane (measured in the longitudinal direction) is of the order of 0.3 mm, for example. This thickness is less than the thickness of the wall of the body 2. This latter thickness can be from 0.5 mm to 1 mm, for example. The width of this membrane 18 is of the order of 0.5 mm. In this numerical example, this means that the difference between the outside radius of the membrane 18 and the inside radius thereof is 0.5 mm.

Figure 3:
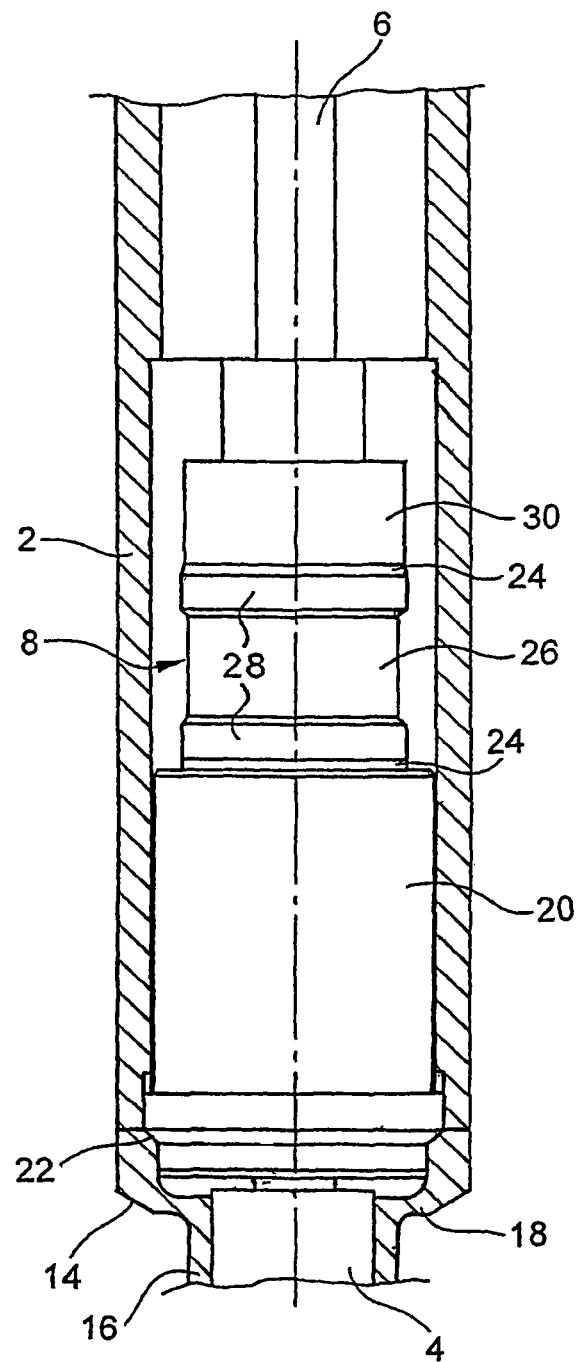
FIG. 3 is a detail view of a membrane of a glow plug of the invention and its pressure sensor.

As can be seen in FIG. 3, the large diameter outside edge of the membrane 18 is connected to the sealing cone 14. The part of the glow plug body 2 situated between the sealing cone 14 and the threaded area 12, including that threaded area, is a rigid area. This area is mounted in the corresponding cylinder head and it is assumed that it is fixed. If axial forces are exerted on the finger 4, the membrane 18 flexes and the finger 4, and likewise the end 16 of the body 2, are displaced in the longitudinal direction. Thus on one side of the membrane 18 there is an area of the glow plug body 2 that is assumed to be fixed and on the other side a mobile area. Thus the membrane 18 decouples these two areas.

If pressure is exerted inside the corresponding cylinder, that pressure exerts on the finger 4 a force tending to cause it to move into the glow plug body 2. This pressure is measured by the pressure sensor 8. This is a piezo-electric sensor.

The pressure sensor 8 is mounted between a fixed part fastened to the immobile part of the glow plug body 2 and a mobile part fastened to the finger 4.

The fixed part is called the interface 20 hereinafter. It is a tubular element of circular cylindrical shape. Its shape and its dimensions are adapted so that it can be housed inside the tubular body 2 and to provide a passage for the core 6. This interface 20 is positioned in the glow plug body 2 just above the sealing cone 14. This part is therefore very close to the finger 4. A seat 22 is provided in the interior surface of the glow plug body 2 to receive the interface 20.

The pressure sensor 8 is placed on the interface 20, i.e. on the same side as the glow plug head 10. In the conventional way, an electrically insulative element 24 is disposed between the interface 20 and the piezo-electric sensor 8. That sensor comprises a piezo-electric element 26 disposed between two contact elements 28 of electrically conductive material. Each of these contact elements 28 is provided with a connecting grid (generally known as a "lead frame") that is molded over it and in the shape of a portion of a cylinder. These connecting grids are not represented in the drawing. Here more conventional connecting terminals can also be provided.

Above the pressure sensor 8 is the mobile part referred to hereinabove. Here it is a ring 30. The latter is also electrically insulated from the pressure sensor 8 by means of an electrically insulative element 24. The ring 30 is welded to the core 6, for example by laser welding.

In the rest state, if no pressure is exerted on the finger 4, the pressure sensor 8 is loaded. If a pressure is exerted on the finger 4, the loading on the pressure sensor is reduced and the pressure sensor 8 measures this variation in loading.

It can be seen that here the pressure sensor is disposed very close to the combustion chamber. It is located very close to the finger 4. This simplifies the sensor assembly. The measurement effected by the sensor is more accurate because of this. When the glow plug is mounted in an engine, the pressure sensor is located inside the cylinder head. Relative to the glow plug, it is located in the region of the fixing area (between the sealing cone 14 and the threaded area 12) in which the glow plug and the cylinder head are connected.

The pressure sensor 8 of the glow plug described hereinabove is not sensitive to stresses in the cylinder head. These various stresses therefore do not influence the measurement effected by this sensor.

The pressure sensor is also isolated from particles and other impurities in the corresponding combustion chamber.

The connection between the end 16 and the finger 4 is perfectly sealed and therefore prevents any migration of particles toward the pressure sensor.

As indicated hereinabove, the membrane 18 is preferably placed in a plane transverse to the glow plug body 2. The mobile assembly, including in particular the finger 4, can then be moved up and down (it is assumed here that the glow plug is in a vertical position, with the head of the glow plug at the top) as a function of the pressure in the corresponding cylinder and exerted on the finger 4. This movement of the membrane is transmitted to the piezo-electric element 26 via the core 6 of the glow plug.

In the embodiment shown, the interface 20 is very close to the finger 4. There is nevertheless a gap between these two parts. This gap is sufficient not to impede the movements of the finger 4. Thus a gap is provided between the finger 4 and the interface 20 that is much larger than the amplitude of the movement of the finger 4.

The pressure measurement effected is preferably independent of temperature. To this end, the membrane 18 is preferably made from an alloy the elasticity whereof does not vary within the ranges of temperature to which the membrane is subjected.

Similarly, the piezo-electric element 26 is chosen so that its sensitivity is independent of temperature. To withstand the relatively high temperatures to which the pressure sensor is subjected, the piezo-electric element 26 takes the form of a monocrystal, for example. It is nevertheless equally possible to use polycrystals having a high Curie temperature, for example greater than 500° C.

It is readily apparent that in the preferred embodiment represented, in which the membrane extends transversely, i.e. in a plane perpendicular to the measurement direction of the pressure sensor 8, expansion of the membrane 18 has no effect on the load applied to the piezo-electric element 26.

The present invention is not limited to the embodiment described hereinabove and to the variants referred to. It also concerns all variants evident to the person skilled in the art.

Thus, for example, all of the numerical data provided is given by way of illustrative and nonlimiting example only.

In the embodiment described, the pressure sensor is disposed very close to the finger forming the heating element of the glow plug. Moving the pressure sensor further away from this finger would not depart from the scope of the invention.

The pressure sensor described is a piezo-electric sensor that is preloaded when fitted. Another embodiment, in which the piezo-electric element operates in compression, for example, can equally be envisaged.

The membrane described is preferably obtained by thinning material. However, if the wall of the body of the glow plug is relatively thin, an elastic deformation area, allowing longitudinal movement, can be obtained without thinning. This membrane is obtained by means of an appropriate shape of the body of the glow plug.

The position of the elastically deformable membrane can be different from that described hereinabove. The preferred embodiment described results in a compact construction of the glow plug. In some cases, a less compact design can be envisaged. For example, a glow plug body can be provided having a first shoulder in the region of which the elastically deformable membrane is located and a second shoulder with a sealing cone.

The invention claimed is:

1. A glow plug, comprising:
a tubular body (2) having at one end a glow plug head (10) and a fixing area having fixing means (12, 14) for fixing into a bore, said fixing means comprised of a threaded area (12), a sealing area (14), and a rigid area extending between the threaded area (12) and the sealing area (14);
a finger (4) mounted on the body (2) of the glow plug at the end opposite the glow plug head (10); and
a pressure sensor (8),
wherein the finger (4) is fixed to the glow plug body (2) so as to be fastened thereto in a connecting area (16),
wherein the tubular body (2) has an elastically deformable part (18) between the i) connecting area (16) connected to the finger (4) and ii) the rigid area of the fixing area, such that said connecting area (16) is mobile and movable longitudinally relative to the bore,
wherein the pressure sensor (8) is disposed between an element (30) fastened to the connecting area (16) and a fixed element (20) of the glow plug,
wherein the elastically deformable part (18) is obtained by thinning material, and
wherein the pressure sensor is contained within the fixing area of the tubular body.

2. The glow plug according to claim 1, wherein the elastically deformable part (18) is an annular area extending in a plane transverse to the tubular body (2) of the glow plug.

3. The glow plug according to claim 1,
wherein the tubular body (2) has an exterior surface and a sealing cone (14) on the exterior surface configured to provide a seal between the glow plug and a cylinder head, and
wherein the elastically deformable part (18) is near said sealing cone (14).

4. The glow plug according to claim 1, wherein the pressure sensor (8) is mounted between a bearing part (20), fixed with respect to the fixing area, and a part (30) connected to the finger (4), mobile with the connecting area (16).

5. The glow plug according to claim 4, wherein the bearing part (20) is situated between the elastically deformable part (18) and the pressure sensor (8), and
wherein the part (30) fastened to the finger (4) is fixed to a core (6) supplying the finger (4) with energy and being preloaded on the sensor (8).

6. The glow plug according to claim 5, wherein the part fastened to the finger (4) is a nut (30) screwed onto the core (6).

7. The glow plug according to claim 1, wherein the pressure sensor (8) is a piezo-electric sensor.

8. The glow plug according to claim 1, wherein the pressure sensor (8) is disposed in the tubular body (2) at a level of the fixing area.

9. A glow plug body (2), comprising:
a glow plug head (10) at a first end;
a fixing area having fixing means (12, 14) for fixing into a bore, said fixing means comprised of a threaded area (12), a sealing area (14), and a rigid area extending between the threaded area (12) and the sealing area (14);
an elastically deformable part (18) between i) a connecting area (16) that is connected to the finger (4) and ii) the rigid area of the fixing area such that said connecting area (16) is mobile and movable longitudinally relative to the bore; and
a pressure sensor (8) contained within the fixing area.

10. The glow plug body (2) according to claim 9, wherein the elastically deformable part (18) is an annular area extending in a plane transverse to the body (2) of the glow plug.

11. An internal combustion engine, comprising:
a glow plug according to claim 1.

12. The glow plug according to claim 2,
wherein the tubular body (2) has an exterior surface and a sealing cone (14) on the exterior surface configured to provide a seal between the glow plug and a cylinder head, and
wherein the elastically deformable part (18) is near said sealing cone (14).

13. The glow plug according to claim 2, wherein the pressure sensor (8) is mounted between a bearing part (20) fixed with respect to the fixing area and a part (30) connected to the finger (4), mobile with the connecting area (16).

14. The glow plug according to claim 2, wherein the pressure sensor (8) is a piezo-electric sensor.

15. The glow plug according to claim 2, wherein the pressure sensor (8) is disposed in the tubular body (2) at a level of the fixing area.

16. A glow plug, comprising:
a tubular body (2) having at one end a glow plug head (10) and a fixing area having means (12, 14) for fixing into a bore;
a finger (4) mounted on the body (2) of the glow plug at the end opposite the glow plug head (10); and
a pressure sensor (8),
wherein the finger (4) is fixed to the tubular body (2) so as to be fastened thereto in a connecting area (16),
wherein the tubular body (2) has an elastically deformable part (18) between i) the connecting area (16) that is connected to the finger (4) and ii) the fixing area such that said connecting area (16) is mobile and movable longitudinally relative to the bore,
wherein the pressure sensor (8) is disposed between an element (30) fastened to the connecting area (16) and a fixed element (20) of the glow plug, and
wherein the pressure sensor (8) is contained within the fixing area of the tubular body (2).

* * * * *

UNITED STATES PATENT AND TRADEMARK OFFICE
CERTIFICATE OF CORRECTION

PATENT NO.       : 8,505,511 B2  
APPLICATION NO.  : 11/918365  
DATED            : August 13, 2013  
INVENTOR(S)      : Ramond et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this
Fifteenth Day of September, 2015

Michelle K. Lee
*Director of the United States Patent and Trademark Office*